(12) United States Patent
Deuytter et al.

(10) Patent No.: US 11,138,875 B2
(45) Date of Patent: Oct. 5, 2021

(54) VEHICLE DETECTION, CONGESTION MONITORING AND CONTROL SYSTEMS AND METHODS

(71) Applicant: FLIR Systems Trading Belgium BVBA, Meer (BE)

(72) Inventors: Michael Deruytter, Marke (BE); Daniel Benhammou, Denver, CO (US)

(73) Assignee: FLIR SYSTEMS TRADING BELGIUM BVBA, Meer (BE)

( * ) Notice: Subject to any disclaimer, the term of this patent is extended or adjusted under 35 U.S.C. 154(b) by 0 days.

(21) Appl. No.: 16/909,737

(22) Filed: Jun. 23, 2020

(65) Prior Publication Data

US 2020/0410856 A1    Dec. 31, 2020

Related U.S. Application Data

(60) Provisional application No. 62/868,827, filed on Jun. 28, 2019.

(51) Int. Cl.
| | |
|---|---|
| *G08G 1/087* | (2006.01) |
| *G08G 1/04* | (2006.01) |
| *H04W 4/029* | (2018.01) |
| *G06K 9/00* | (2006.01) |
| *H04W 4/80* | (2018.01) |
| *H04W 80/02* | (2009.01) |
| *H04W 4/40* | (2018.01) |

(52) U.S. Cl.
CPC ......... *G08G 1/087* (2013.01); *G06K 9/00785* (2013.01); *G08G 1/04* (2013.01); *H04W 4/029* (2018.02); *H04W 4/40* (2018.02); *H04W 4/80* (2018.02); *H04W 80/02* (2013.01)

(58) Field of Classification Search
CPC ......... G08G 1/087; G08G 1/04; H04W 4/029; H04W 4/80; H04W 4/40; H04W 80/02; G06K 9/00785
See application file for complete search history.

(56) References Cited

U.S. PATENT DOCUMENTS

| | | | |
|---|---|---|---|
| 10,616,486 B2* | 4/2020 | Corona | ............ G06T 7/246 |
| 2015/0105933 A1* | 4/2015 | Martin | ............ G01C 21/26 |
| | | | 701/1 |
| 2018/0059669 A1* | 3/2018 | Madigan | ............ G08G 1/04 |
| 2019/0197887 A1* | 6/2019 | Modi | ............ G08G 1/04 |
| 2020/0111358 A1* | 4/2020 | Parchami | ............ G05D 1/028 |

\* cited by examiner

*Primary Examiner* — Mohamed Barakat
(74) *Attorney, Agent, or Firm* — Haynes and Boone, LLP

(57) ABSTRACT

Systems and methods for controlling traffic signaling includes a wireless sensor operable to detect and receive wireless signals emitted from a vehicle, an image sensor operable to capture a stream of images of a field of view. A traffic control system is operable to extract geographic positioning information for the vehicle from the wireless signals, track the vehicle's movement using the extracted geographic positioning information, detect and track an object in the stream of images corresponding to the vehicle. The vehicle's geographic movement is further tracked using a pixel location of the object in steam of images and a traffic control action is executed based on the geographic movement to facilitate passage of the at least one vehicle through a monitored traffic control location.

20 Claims, 7 Drawing Sheets

VEHICLE DETECTION, CONGESTION MONITORING AND CONTROL SYSTEMS AND METHODS

CROSS REFERENCE TO RELATED APPLICATIONS

This application claims the benefit of and priority to U.S. Provisional Patent Application No. 62/868,827 filed Jun. 28, 2019 and entitled "VEHICLE DETECTION, CONGESTION MONITORING AND CONTROL SYSTEMS AND METHODS," which is incorporated herein by reference in its entirety.

TECHNICAL FIELD

The present application relates generally to vehicle and traffic infrastructure communications and, more particularly for example, to systems and methods for real-time analysis and communications between components of an intelligent traffic system.

BACKGROUND

Modern traffic control is heavily dependent on the use of sensors to help mitigate congestion and improve safety. These sensors range in capabilities from the ability to simply detect vehicles in closed systems (e.g., provide a simple contact closure to a traffic controller) to those that are able to classify (e.g., distinguish between bikes, cars, trucks, etc.) and monitor the flows of vehicles.

Within a traffic control system, a traffic signal controller may be used to manipulate the various phases of traffic signal at an intersection and/or along a roadway to affect traffic signalization. These traffic control systems are typically positioned adjacent to the intersection/roadway they control (e.g., disposed upon a traffic signal pole). Traffic control systems generally comprise an enclosure constructed from metal or plastic to house electronic equipment such as a sensor (e.g., an infrared imaging camera or other device), communications components and control components to provide instructions to traffic signals or other traffic control/monitoring devices.

The operation of the traffic signal may be adaptive, responsive, pre-timed, fully-actuated, or semi-actuated depending upon the hardware available at the intersection and the amount of automation desired by the operator (e.g., a municipality). For instance, cameras, loop detectors, or radar may be used to detect the presence, location and/or movement of one or more vehicles. In response to a vehicle being detected, a traffic signal controller may alter the timing of the traffic signal cycle, for example, to shorten a red light to allow a waiting vehicle to traverse the intersection without waiting for a full phase to elapse or to extend a green phase if it determines an above-average volume of traffic is present and the queue needs additional time to clear.

The nature of traffic congestion makes it difficult to predict and therefore difficult to avoid. For instance, traffic collisions and stalled vehicles may occur anywhere within a traffic network, causing a localized disturbance in traffic flow which may ripple throughout the system. Additionally, not all disruptions in traffic flow are caused by substantial events such as collisions and breakdowns. Minor delays may be created by human behavior which may aggregate into significant delays. These and other traffic conditions make it difficult for control systems, vehicle navigation systems, emergency vehicles and other related systems to optimize traffic-related processing in real-time. In view of the foregoing, there is a continued need for improved traffic control systems and methods.

SUMMARY

Improved traffic infrastructure systems and methods are disclosed herein. In various embodiments, an intelligent transportation system (ITS) communicates with one or more traffic control systems to receive local sensor data, analyze traffic conditions and/or control a traffic signal. The traffic control systems may include including one or more sensors (e.g., an infrared/thermal imaging sensor, a visible light imaging sensor) disposed to monitor vehicles at a traffic location, and a control processor to control traffic lights and/or other devices. In some embodiments, the traffic control system is equipped with communications components operable to communicate with compatible vehicle-to-everything (V2X) communications devices. One or more vehicles may be equipped with corresponding V2X communications components that allow communications with components of the traffic infrastructure system, such as a camera equipped with a V2X receiver.

In some embodiments, the ITS includes an infrared camera configured to facilitate infrared (e.g., thermal) based vehicle detection. The infrared camera is configured to detect vehicles within a field of view of the infrared camera and send an electronic signal to a traffic control system. The traffic control system is configured to adjust traffic lights and/or other signals to facilitate vehicle, bicycle, pedestrian and other traffic can cross and intersection/road safely and efficiently. The infrared camera may include a high resolution (e.g., 14-bit imaging) thermal imager. In some embodiments, the infrared camera and/or other components of a local traffic control system may include wireless communications components configured to identify wireless devices (e.g., by detecting a media access control (MAC) address transmitted by the wireless device) to facilitate the calculation of additional information related to vehicle location (e.g., time-of-travel) and the ability to monitor the flow of traffic through a local infrastructure (e.g., through a city or region).

In some embodiments, the infrared camera and/or other components of the traffic control system are connected to the cloud or other networked system so that the individual sensors may be processed as part of a network of sensors of the ITS. The cloud system may include a cloud analytics platform allowing users to analyze historical information and/or monitor traffic conditions in real time. The cloud analytics platform may provide a variety of processing functions including aggregating data over an entire city (or other region) and providing APIs to centrally control the flow of traffic and other resources (e.g., electronic signs) using data from the sensors.

In some embodiments, the camera for monitoring traffic conditions is communicably coupled to a local traffic control system, such as an intersection controller. In operation, the camera may receive a signal from the cloud platform and/or other components of the ITS to provide real time control of the traffic lights (or other traffic control devices) to ensure safe and efficient passage of vehicles and pedestrians. In some embodiments, a vehicle communications system tracks location and other status information, including the vehicle GPS location and transmits V2X messages to traffic control components identifying the vehicle and geographic location. In some embodiments, traffic control devices are calibrated through a process for mapping image pixel coordinates to the real-world GPS coordinates and vice versa.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The present disclosure illustrates various embodiments of improved traffic infrastructure systems and methods. In some embodiments, an intelligent transportation system (ITS) includes facilitates communications between components of various vehicle traffic and communications systems, traffic control systems and cloud/network processing systems. Infrared image capture and mapping for vehicle-to-everything (V2x) systems and methods are also provided in various embodiments. In some embodiments, an infrared camera provides vehicle, bicycle and pedestrian detection while collecting high-resolution traffic information and streaming in real-time to one or more cloud/network processing systems, such as a cloud analytics platform. The cloud analytics platform provides the ability to centralize and aggregate information in addition to generating information by looking at trends of information from a plurality of roadway segments and across traffic regions (e.g., entire cities).

In some systems, infrared imaging technology (e.g., thermal imaging) produces data for input to video processing and analytics systems. An infrared camera system may include an embedded processing unit which includes a thermal core for imaging and an embedded processor for analyzing the thermal images stream (e.g., to detect vehicles). In some embodiments, an infrared camera is positioned to have a field of view of a roadway and can count and classify vehicles as well as measure performance indicators such as occupancy, level of service, and other indicators. The ITS may also include additional traffic data generation components, including components to scan for wireless MAC addresses and generate traffic analysis from the resulting data. Such traffic information allows the ITS to monitor travel-time, origin-destination and other metrics that demonstrate how people and vehicles move through traffic regions.

Figure 1:
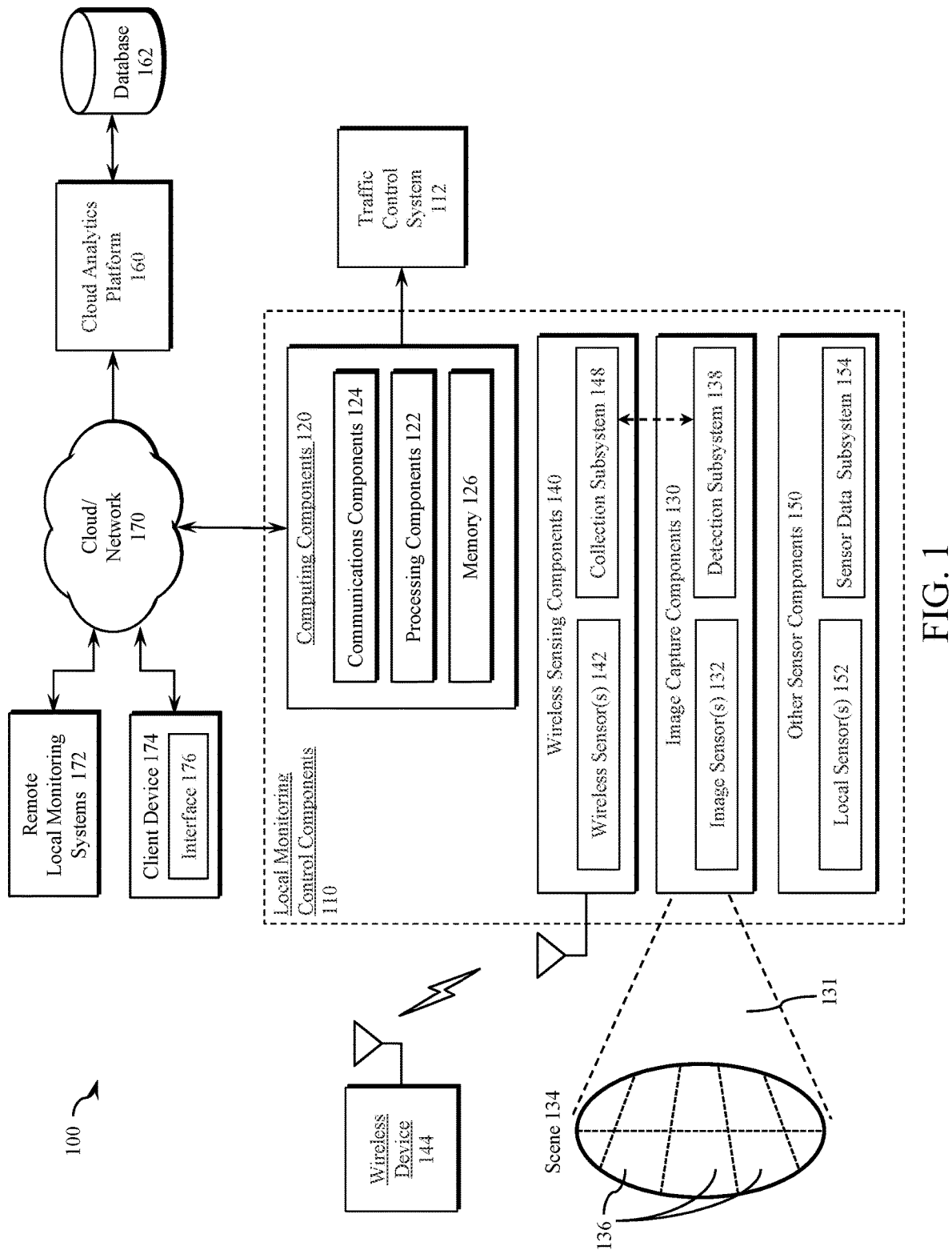
FIG. 1. illustrates an example intelligent transportation system, in accordance with one or more embodiments.

Referring to FIG. 1, a system in accordance with one or more embodiments of the present application will now be described. In some embodiments, an intelligent transportation system (ITS) 100 includes local monitoring and control components 110 for monitoring a traffic region and/or controlling a traffic control system 112 associated with the traffic region (e.g., a system for controlling a traffic light at an intersection). The local monitoring and control components 110 may be implemented in one or more devices associated with a monitored traffic area, and may include various processing and sensing components, including image capture components 130, wireless sensing components 140, computing components 120, and other sensor components 150.

The image capture components 130 are configured to capture images of a field of view 131 of a traffic location (e.g., scene 134 depicting the monitored traffic region). The image capture components 130 may include infrared imaging (e.g., thermal imaging), visible spectrum imaging, and/or other imaging components. In some embodiments, the image capture components 130 include a detection subsystem 138 configured to process infrared imagery (e.g., 14-bit thermal imagery) in real-time to identify vehicles, bicycles, pedestrians and other objects as desired. In some embodiments, the detection subsystem 138 can be configured through a web browser interface and/or software which is installed on a client device (e.g., remote client device 174 with interface 176 and/or another system communicably coupled to the image capture components 130). The configuration may include defining detection zones 136 within the scene 134. When an object passes into a detection zone 136, the detection subsystem 138 detects and classifies the object. In a traffic monitoring system, the system may be configured to determine if an object is a pedestrian, bicycle or vehicle. If the object is a vehicle or other object of interest, further analysis may be performed on the object to determine a further classification of the object (e.g., vehicle type) based on shape, height, width, thermal properties and/or other detected characteristics.

Based on the objects and events detected by the detection subsystem 138, a control signal may be sent to a traffic control system 112 in a number of ways including a contact closure, an electronic signal to an interface card, an event through an API, through computing components 120, or other communications. In various embodiments, the detection subsystem 138 may be further configured to count the number of detected objects in each detection zone, which may be broken down by classification, time and date and other data. The detection subsystem 138 may further be configured to measure the occupancy of a detection zone 136 (e.g., percentage of time that a detection zone 136 is occupied), level of service, headway, and other data. In some embodiments, the detection subsystem 138 may communicate directly with the local traffic signal controller 112, which uses the data produced by the detection subsystem 138 and/or received by the cloud analytics platform 160 or other local components to control traffic signals.

In some embodiments, the image sensor is an infrared camera for monitoring traffic conditions and is communicably coupled to the computing components and/or the traffic control system 112 (such as an intersection controller). In operation, the image capture components and/or computing components 120 may receive a signal from the cloud analytics platform 160 and/or other components of the ITS 100 to provide real time control of the traffic control system (or other traffic control devices) to ensure safe and efficient passage of vehicles and pedestrians.

The wireless sensing components 140 are configured to detect one or more wireless devices 144 in the proximity of the scene 134 and/or traffic control system 112 (e.g., within wireless range of the wireless sensing components 140 located in or adjacent to the scene 134). The wireless sensing components 140 may be configured to communicate over any wireless protocol, such as Wi-Fi, that includes a transmission by a wireless device 144 of a unique device identifier (e.g., issue a network join request including a unique device MAC). In some embodiments, a vehicle communications system tracks location and other status information, including the vehicle GPS location and transmits V2X messages to traffic control components (such as computing components 120 and/or cloud analytics platform 160) identifying the vehicle and geographic location. In some embodiments, traffic control devices are calibrated through a process for mapping image pixel coordinates to the real-world GPS coordinates and vice versa.

A collection subsystem 148 is configured to capture wireless identifiers (e.g., Wi-Fi MAC addresses) by monitoring for probe requests transmitted by local wireless devices. For example, when a wireless device 144 equipped with a Wi-Fi radio (such as mobile phones, tablets, etc.) uses location services or attempts to find a familiar Wi-Fi access point, the wireless device 144 may transmit packets of information in a probe request, which contains a unique identifier such as a MAC address. In addition to the MAC address, the signal strength of the probe request (RSSI) may be captured by the collection subsystem 148.

The local monitoring and control components 110 further include computing components 120 configured to provide additional processing and facilitate communications between various components of the intelligent traffic system 100. The computing components 120 may include processing components 122, communication components 124 and a memory 126, which may include program instructions for execution by the processing components 122. For example, the computing components 120 may be configured to process data received from the image capture components 130, wireless sensing components 140, and other sensing components 150. The computing components 120 may be configured to communicate with a cloud analytics platform 160 or other networked server to transmit local data for further processing. The computing components 120 may be further configured to receive processed traffic data associated with the scene 134, traffic control system 112, and/or other traffic control systems and local monitoring systems in the region. The computing components 120 may be further configured to generate and/or receive traffic control signals for controlling the traffic control system 112. In some embodiments, the local monitoring and control components 110 further include other sensing components 150, which may include other local sensors 152 (e.g., a roadway loop sensor, radar, etc.) and a sensor data subsystem 154 configured to process the sensor data.

The computing components 120 and other local monitoring and control components 110 may be configured to combine local detection of pedestrians, cyclists, vehicles and other objects for input to the traffic control system 112 with data collection that can be sent in real-time to a remote processing system (e.g., the cloud 170) for analysis and integration into larger system operations. In some embodiments, the collection subsystem 148 initiates a secure and encrypted transport layer security (TLS) connection to a cloud analytics platform 160 on the cloud 170. Once established, the collection subsystem 148 may establish a web socket connection which allows the MAC address data to be streamed in real-time to the cloud analytics platform 160 where it can be analyzed to produce travel-time and other information.

In one embodiment, the collection subsystem 148 is configured to communicate with the detection subsystem 138 via internal APIs which allows the collection subsystem 148 to collect available data from both subsystems including detection events, volume, speed and occupancy data. The collection subsystem 148 transmits this data to the cloud analytics platform 160 through the established web socket connection. By leveraging a single connection, the collection subsystem 148 reduces latency (e.g., to 100 ms or less) and further reduces bandwidth by avoiding the overhead of reestablishing a connection for every data upload. In various embodiments, the collection subsystem 148 may be implemented by wireless sensing component 140, computing components 120 and/or other processing components of the local monitoring and control components 110. In some embodiments, the collection subsystem 148 is configured to collect data from a plurality of local sensors.

Should the connection to the cloud analytics platform 160 be lost, the collection subsystem 148 will reestablish a connection to continue to pass data directly. If it is not possible to reestablish a connection, the collection subsystem 148 may archive data locally at the wireless sensing components 140 and/or computing components 120 until such a connection can be reestablished. After connectivity has been restored, the data which had been archived locally is uploaded in fragments to facilitate easier uploading. In one embodiment, the newest fragments of data shall be uploaded first to minimize the immediate gap in travel-time and other congestion information while the oldest data will be the last data to be uploaded.

The collection subsystem 148 may also connect to the cloud analytics platform 160 on a periodic basis to monitor for changes to configuration or firmware updates. The collection subsystem 148 may download the modified configuration from the cloud analytics platform 160 and affect those changes on the local sensor components. Similarly, if one or more of the sensor components and/or computing components detects the need to modify its firmware, it will download the firmware file in pieces which it can reconstruct on the local sensor. Once all pieces of the firmware update have been downloaded and reassembled, the collection subsystem 148 may verify the integrity of the firmware package by verifying the cryptographic signature of the package. After verification, the collection subsystem 148 may upgrade the firmware on the local sensor (e.g., wireless sensor 142). The collection subsystem 148 may also monitor the sensor for all logs including system, error or other runtime logs relating to the Linux operating system, detection subsystem or collection subsystem and upload these logs to the cloud analytics platform.

The cloud analytics platform 160 is configured to receive the data from the collection subsystem 148 where it is archived in a database 162 for further analysis. The cloud analytics platform 160 may also be configured to receive data from collection subsystems of other remote local monitoring systems 172. For example, MAC addresses from sensors which are position at monitoring locations that are proximate to the local monitoring control components 110 are matched and then the data filtered in order to generate travel-time and other congestion metrics across regions in real time. Data from the detection subsystem 138 may be stored as collected by the detection subsystem and further aggregated and analyzed in accordance with system specifications. The data may be available to users and other systems through a number of different modes including graphs, charts and APIs.

Figure 2:
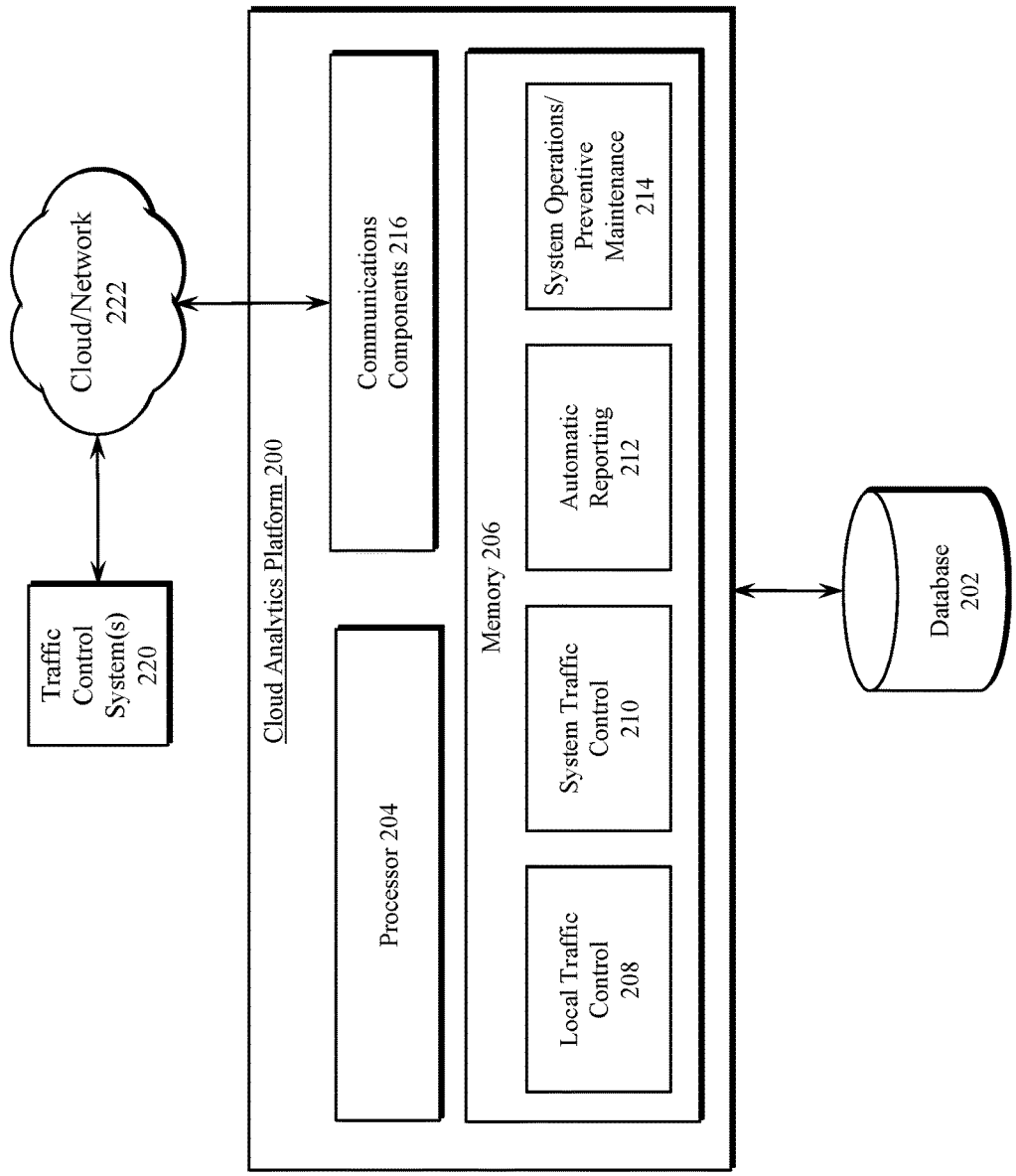
FIG. 2 illustrates an example cloud analytics platform, in accordance with one or more embodiments.

An embodiment of a cloud analytics platform 200 will be further described with reference to FIG. 2. The cloud analytics platform 200 includes a database 202, a processor 204, a memory 206 and communications components 216. The database 202 stores sensor data, analysis results and other data used by an intelligent traffic system. The processor 204 may include one or more processors or controllers for controlling the operation of the cloud analytics platform 200, which may include executing instructions stored in the memory 206. The memory 206 may include random access memory, read only access memory and/or other memories for storing data and program instructions. In some embodiments, the memory 206 stores one or more applications including a local traffic control application 208 configured to provide control instructions and/or information to one or more local traffic control systems 220, and a system traffic control application 210 configured to synthesize data and analysis associated with a plurality of traffic control systems 220 and coordinate traffic control. The memory 206 may further include an automatic reporting application 212 to provide feedback to one or more systems or users, and system operations/preventative maintenance applications 214 for updating and configuring local traffic control systems 220. The cloud analytics platform 160 may enable a number of different applications which include but are not limited to the applications described herein. The communications components 216 facilitate communications with one or more networked device (e.g., traffic control systems 220) through a network 222 such as the Internet or the cloud.

The cloud analytics platform 200 may be configured to provide system traffic control through communication with an advanced traffic management system (ATMS) by providing information including travel-time, intersection delay, turning movement counts, slowing traffic, Level of Service, occupancy, and other available information (e.g., by way of APIs). The ATMS system may in turn send signal to traffic controllers to modify their signal timing plan to change signal coordination involving one or more traffic intersections. The cloud analytics platform may be used to automatically or manually generate reports based on data generated by the detection subsystem, collection subsystem or both subsystems. These reports may be automatically emailed to users based on criteria which they may define.

The data available in the cloud analytics platform 200 may be used to identify regular and anomalous traffic patterns to help traffic engineers identify systemic traffic issues resulting from poorly timed intersections or other traffic patterns. The cloud analytics platform 200 may also provide the ability to automatically review logs as uploaded by the collection subsystem to identify misconfigured sensors or other issues which may be indicative of improper setup or sensor failure. By monitoring logs in aggregate, advance notice may be given to end users regarding likely system maintenance or potential system failure.

In some embodiments, the wireless sensor, infrared camera and/or other components of the local traffic control system may be connected to the cloud analytics platform 200 so that the individual sensors may be processed as part of a network of sensors of the ITS. The cloud analytics platform may users to analyze historical information and/or monitor traffic conditions in real time. The cloud analytics platform 200 may provide a variety of processing functions including aggregating data over an entire city (or other region) and providing APIs to centrally control the flow of traffic and other resources (e.g., electronic signs) using data from the sensors.

Various implementation embodiments of components of an intelligent traffic system will now be described in further detail with reference to FIGS. 3-7. In various embodiments, an intelligent transportation system may include one or more traffic control devices disposed to monitor one or more traffic locations, one or more sensors (e.g., wireless sensor, an imaging sensor, loop detector, radar or other sensor) and a control processor to control the operation of signals at the traffic location (e.g., traffic lights at an intersection).

In some embodiments, the traffic control device is equipped with communications components (e.g., 802.11p wireless protocol, cellular, Bluetooth, Wi-Fi, or other wireless components) that can communicate with compatible V2X communications devices. One or more vehicles may also be equipped with corresponding communications components that allow communications with components of the traffic infrastructure system, such as a camera equipped with a V2X receiver. In some embodiments, the camera is communicably coupled to the traffic controller at an intersection or other traffic monitoring and control location. In operation, the camera may capture a stream of images of the intersection, detect and track objects in the captured images (e.g., vehicle traffic, pedestrian traffic) and control the traffic control components in accordance therewith. In some embodiments, the camera is further operable to receive a signal from an emergency or other priority vehicle and provide real time control of the traffic signs and/or lights to ensure the safe and efficient passage of the priority vehicle through the intersection. In some embodiments, the vehicle communications system tracks status information, including the vehicle geographic location and generates V2X messages from a V2X module of the vehicle to transmit the status information to the traffic control components.

In various embodiments, the traffic control systems disclosed herein provide calibration functionality for mapping between captured image pixels and GPS locations. For example, the traffic control system may include a process for mapping between pixel positions and real-world coordinates. In some embodiments, this mapping is relative with respect to the camera. In some embodiments a traffic control system may be configured and calibrated through a process that includes positioning an object in the view of view at one or more known geographic locations and detecting the pixel location of the object in the captured image. In some embodiments, the traffic control system may also be configured to communicate some detections, data and/or instructions to a vehicle, such as an autonomous vehicle and/or a priority vehicle such as an emergency vehicle (e.g., fire engine or ambulance).

In some embodiments, the traffic monitoring camera is configured to track the location of a vehicle, including tracking using GPS coordinators, tracking based on pixel location, and transitioning between using GPS coordinates and pixel coordinates on captured images. In one embodiment, the camera may be calibrated by setting up the camera, capturing images using a GPS sensor and communications transceiver to transmit GPS data to the camera. The camera may then detect the location of the GPS sensor on the image and map the pixel location to the receive GPS coordinates. It will be understood that the GPS coordinates may be averaged/smoothed across a plurality of pixels on the image, which may then be set as the corresponding GPS coordinates for a pixel location. In another embodiment, the camera may automatically calibrate using tilt angle, height and direction of the camera, and known identifiable from the field of view of the camera. In another approach, the GPS data may be automatically calibrated from information from other vehicles passing by. In one approach, the system is initialized with at least one known GPS location in the field of view and the system may track the object and GPS locations as the object moves through the field of view. In another approach, the traffic monitoring system tracks identified objects appearing in the imaged scene and finds a best match between an object track in the image and the GPS coordinates of the object.

Figure 3:
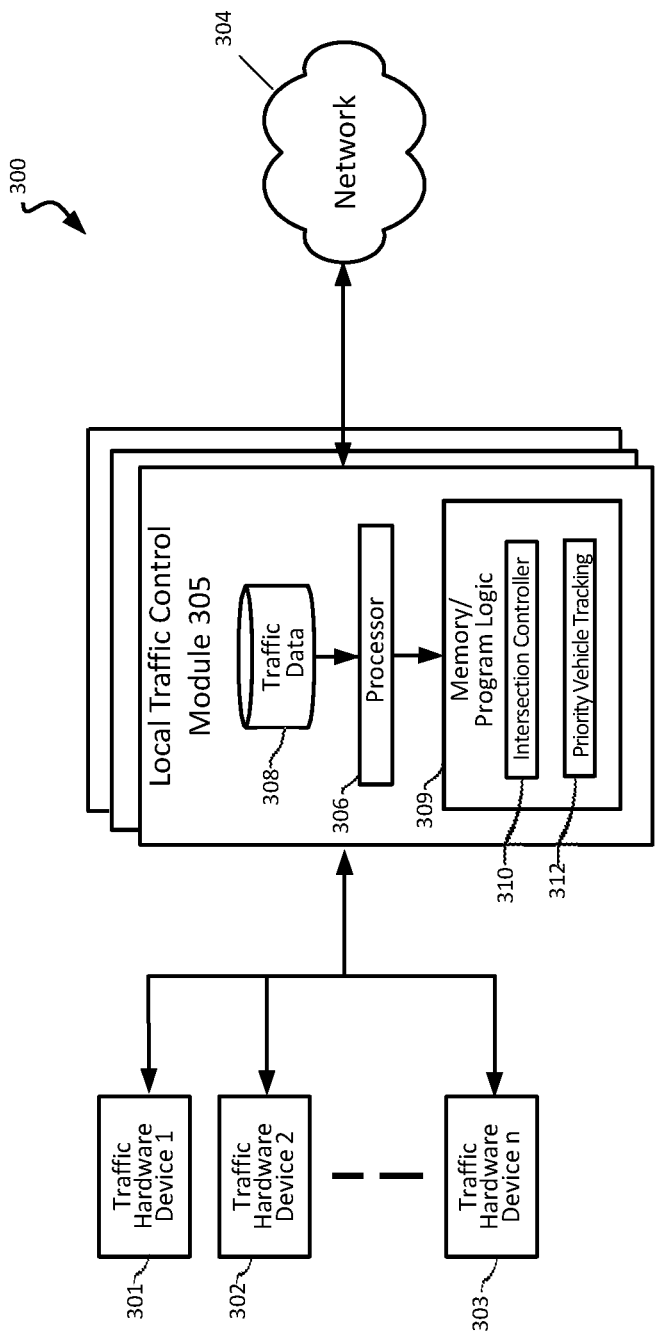
FIG. 3 illustrates an example intelligent transportation system, in accordance with one or more embodiments.

FIG. 3 illustrates example intelligent transportation system (ITS) 300, in accordance with one or more embodiments. The ITS 300 is operable to monitor and control traffic signaling for at least one location. In the illustrated system, traffic signal information is obtained by a network of traffic hardware devices 301-303. Traffic hardware devices may be, for example, a traffic controller, traffic camera, intersection controller, inductive loop detector, microwave detector, magnetometer, traffic radar, thermal sensor, conflict monitor, general hardware I/O, road weather information system or other system. The traffic hardware devices 301-303 may be disposed within, on, under, adjacent, above, or otherwise relative to a roadway. Traffic hardware devices may be stored, for example, within a traffic control cabinet or upon a support mast.

The traffic hardware devices 301-303 may provide raw or preprocessed data to a local traffic control module (LTCM) 305. In some embodiments, the traffic hardware devices 301-303 may correspond to image capture components 130, wireless components 140 and other sensor components 150 of FIG. 1. The LTCM 305 may be embodied as a single device or may be a system distributed across multiple devices in operative communication. The traffic hardware devices 301-303 may be connected to the LTCM 305 via a wireless and/or wired connection. Such a connection may be via a network or direct communication channel. The illustrated LTCM 305 includes a processor 306 that can access data including traffic data stored in memory module 308. Such traffic data may be obtained from traffic hardware devices 301-303. In addition, processor 306 may access one or more algorithms from stored program logic 309, including an intersection controller 310, for controlling traffic at an intersection in response to receive sensor data, and a priority vehicle tracking module 312, operable to communicate with and track a priority vehicle and facilitate intersection control in accordance therewith. Various system components may be connected to a network 304, such as the cloud, for data sharing and/or offline processing.

Figure 4:
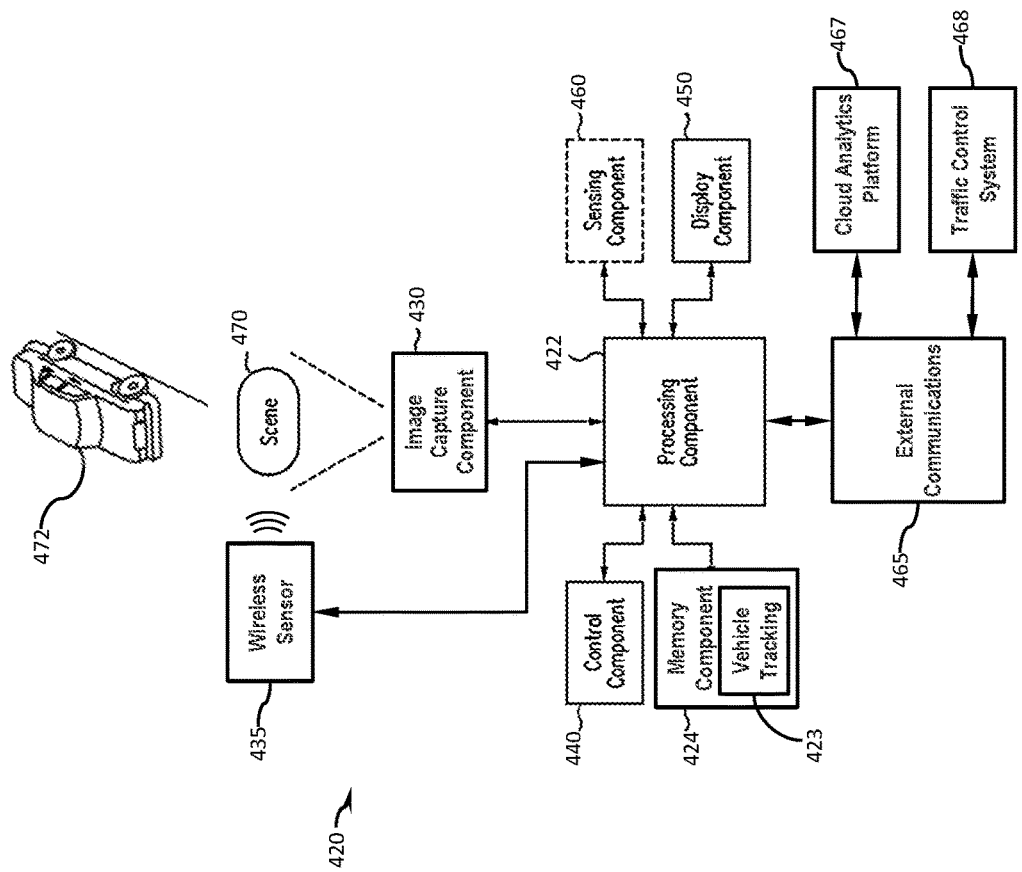
FIG. 4 is an example image processing system, in accordance with one or more embodiments.

Turning now to FIG. 4, an example monitoring system 420 for use in a traffic monitoring and control system will be described in accordance with various embodiments. The monitoring system 420 is operable to capture and process images and includes, in one implementation, a processing component 422, a memory component 424, an image capture component 430, a wireless sensor component 435, a control component 440, and/or a display component 450. The monitoring system 420 may further include an additional sensing component 460 and external communications components 465, providing communications with one or more external networks or servers 467 and vehicles 468.

In various embodiments, monitoring system 420 may represent, for example, an imaging system such as an infrared imaging device, a visible light imaging device (e.g., a video camera), or a multi-band imaging device for capturing and processing images, such as video images of a scene 470. In some embodiments, monitoring system 420 may represent an infrared camera adapted to detect thermal radiation and provide representative data and information (e.g., thermal image data of a scene) and/or may represent more generally any type of electro-optical sensor system. Monitoring system 420 may comprise a single location installation and/or a distributed networked system.

In various embodiments, processing component 422 may comprise any type of a processor or a logic device (e.g., a programmable logic device (PLD) configured to perform processing functions). Processing component 422 may be adapted to interface and communicate with components 424, 430, 435, 440, 450, 460 and 465 to perform method and processing steps and/or operations, as described herein such detecting, tracking and receiving communications from a vehicle 472, and facilitating traffic control actions.

Memory component 424 comprises, in one embodiment, one or more memory devices adapted to store data and information, including for example image data, wireless data and object identification and tracking information. Memory component 424 may comprise one or more various types of memory devices including volatile and non-volatile memory devices. In one aspect, the memory component 424 comprises a random-access memory (RAM), a read-only memory (ROM), component electronically programmable read-only memory (EPROM), erasable electronically programmable read-only memory (EEPROM), other flash memory, Secure Digital (SD) Card, as well as other suitable forms of memory. The functions of the monitoring system 420 may be implemented through dedicated hardware and circuitry and software programs that may be installed into the memory component 424 of the monitoring system 420. The monitoring system 420 generally includes several software programs or modules, each comprising a plurality of executable instructions which, when stored in the memory component 424, cause the processing component 422 to perform the processes shown and described hereinafter.

In various embodiments, the processing component 422 comprises an embedded microprocessor for data processing as well as controlling the operation of the monitoring system 420. Generally, the embedded microprocessor comprises a plurality of digital and analog ports for interfacing with the different components of the monitoring system 420. In one aspect, the microprocessor controls the image capture component 430 and wireless sensor component 435, commands the sensors to capture data, processes the data, and provides an output in accordance with various aspects in the present disclosure. In one aspect, the embedded microprocessor comprises a system-on-chip as well as a digital signal processing (DSP) architecture, peripherals for interfacing with the different components in the monitoring system 420, peripherals for networking, booting and encryption, and may run an operating system.

The monitoring system 420 may be programmed via external communications components 465 to perform various aspects of the present disclosure, and any resulting software programs are generally stored in the memory component 424. In one aspect, the microprocessor commands the image and wireless sensors to acquire data from an associated area, processes the data from the different sensors, and outputs analytical results according to the various embodiments of the present disclosure. The monitoring system 420 may also comprise ports of power delivery, programming, data transfer, networking and any other component as required by the processes described by the various embodiments of the present disclosure.

Image capture component 430 comprises, in one embodiment, any type of image sensor operable to detect and track traffic, pedestrians and other objects appearing in the scene 470. For example, the image capture component 430 may include an image sensor having one or more image detector elements such as infrared (e.g., thermal) photodetector elements and/or visible light photodetector elements for capturing infrared image data (e.g., still image data and/or video data) representative of a scene such as scene 470. In one aspect, one or more sensors may be housed in separate sections in the monitoring system 420 and interfaced with the rest of the monitoring system 420 via internal connections, such as digital or analog busses or connectors. In one aspect, the sections in the monitoring system 420 may comprise the supporting structure and components required to enable normal operation of the imaging sensors.

In one embodiment, image capture component 430 may be configured to generate digital image data representing incoming thermal radiation from scene 470. Image capture component 430 may include one or more signal processing components such as analog-to-digital converters included as part of an image sensor or separate from the image sensor as part of monitoring system 420. In one aspect, image data (e.g., video data) may comprise non-uniform data (e.g., real image data) of a scene such as scene 470. Processing component 422 may be adapted to process the image data (e.g., to provide processed image data), store the image data in memory component 424, and/or retrieve stored image data from memory component 424. For example, processing component 422 may be adapted to process image data stored in memory component 424 to provide processed image data and information (e.g., captured and/or processed image data). Processing component 422 may further include (or be controlled by) vehicle tracking logic 423 for tracking vehicle locations (e.g., through image processing, and/or wireless data processing), analyzing vehicle and traffic information and facilitating traffic control actions to facilitate the passage of the vehicle through the monitored intersection.

Control component 440 comprises, in one embodiment, a user input and/or interface device. For example, the user input and/or interface device may represent a rotatable knob (e.g., potentiometer), push buttons, slide bar, keyboard, etc., that is adapted to generate a user input control signal. Processing component 422 may be adapted to sense control input signals from a user via control component 440 and respond to any sensed control input signals received therefrom. Processing component 422 may be adapted to interpret such a control input signal as a parameter value, as generally understood by one skilled in the art. In one embodiment, control component 440 may comprise a separate control unit (e.g., a wired or wireless unit) having push buttons adapted to interface with a user and receive user input control values. In one implementation, the push buttons of the control unit may be used to control various functions of the monitoring system 420, such as autofocus, menu enable and selection, field of view, brightness, contrast, noise filtering, high pass filtering, low pass filtering, and/or various other features as understood by one skilled in the art.

The monitoring system 420 may include an optional display component 450 which comprises, in one embodiment, an image display device (e.g., a liquid crystal display (LCD) or various other types of generally known video displays or monitors). Processing component 422 may be adapted to display image data and information on the display component 450. Processing component 422 may be adapted to retrieve image data and information from memory component 424 and display retrieved image data and information on display component 450. Display component 450 may comprise display electronics, which may be utilized by processing component 422 to display image data and information (e.g., infrared images). In some embodiments, display components may be provided through other user devices (e.g., a mobile device or desktop computer) that access processed data via a network or server system.

Optional sensing component 460 comprises, in one embodiment, one or more additional sensors of various types, depending on the application or implementation requirements of the monitoring system 403, as would be understood by one skilled in the art. The sensors of optional sensing component 460 provide data and/or information to at least processing component 422. In one aspect, processing component 422 may be adapted to communicate with sensing component 460 (e.g., by receiving sensor information from sensing component 460) and with image capture component 430 (e.g., by receiving data and information from image capture component 430 and providing and/or receiving command, control, and/or other information to and/or from one or more other components of monitoring system 420).

In various implementations, optional sensing component 460 may provide additional information regarding environmental conditions, such as temperature, lighting conditions (e.g., day, night, dusk, and/or dawn), and/or specific weather conditions (e.g., sun, rain, and/or snow). Sensing component 460 may represent conventional sensors as generally known by one skilled in the art for monitoring various conditions (e.g., environmental conditions) that may have an effect (e.g., on the image appearance) on the data provided by image capture component 430. In some implementations, optional sensing component 460 (e.g., one or more of sensors) may comprise devices that relay information to processing component 422 via wired and/or wireless communication.

In various embodiments, components of monitoring system 420 may be combined and/or implemented, as desired or depending on the application or requirements, with monitoring system 420 representing various functional blocks of a related system. In one example, processing component 422 may be combined with memory component 424, image capture component 430, display component 450, and/or optional sensing component 460. In another example, processing component 422 may be combined with image capture component 430 with only certain functions of processing component 422 performed by circuitry (e.g., a processor, a microprocessor, a logic device, a microcontroller, etc.) within image capture component 430. Furthermore, various components of monitoring system 420 may be remote from each other (e.g., image capture component 430 may comprise a remote sensor with processing component 422, etc. representing a computer that may or may not be in communication with image capture component 430).

External communication components 465 can include a variety of suitable input/output connection interfaces, such as wired connections, standard serial ports, parallel ports, S-video ports, large area network (LAN) ports, small computer system interface (SCSI) ports, or other suitable wired connections. Additionally, the external communication components 465 can include, for example, wireless connections, such as 802.11p, infrared ports, optical ports, Bluetooth wireless ports, wireless LAN ports, ultra-wide band (UWB) wireless ports, among others as will occur to one of ordinary skill in the art.

As will be understood by one of ordinary skill in the art, the hardware and specific circuitry of embodiments of the monitoring system 420 can vary according to aspects of the present disclosure. Accordingly, although examples of the hardware associated with the monitoring system 420 have been previously described, it is not intended that the present disclosure be limited to the specific embodiments or aspects presented, and other variations of the monitoring system 420 will be apparent to one of ordinary skill in the art.

In some embodiments, the processing component 422 is operable to monitor vehicle motion using wireless sensor 435. For example, the processing component 422 may receive MAC address data from a vehicle (e.g., vehicle 472) allowing the processing component 422 to track the geographic location of the vehicle. The processing component 422 may further transmit the MAC address data to a cloud analytics platform 467 to further track the vehicle 472 across various traffic regions. The processing component 422 may also track the location of the vehicle through image capture, object detection and mapping image pixels associated with the detected object to geographic coordinates. In various embodiments, the vehicle 472 may pass through the field of view of the image capture components 430 and/or or pass within and out of communication range of the wireless sensor 435. The processing component 422 may also track other traffic and objects within the field of view and/or within range of the wireless sensor 435. In various embodiments, the vehicle identifies itself to the monitoring system 420, for example, by a unique device identifier such as a MAC address. In some embodiments, the vehicle is a priority vehicle (e.g., an emergency vehicle such as an ambulance) and the processing component 422 uses sensed data and traffic information to determine a traffic control command. In some embodiments, the processing component 422 may transmit instructions or other data to the priority vehicle for use by a local vehicle computer system and/or a vehicle operator.

Figure 5:
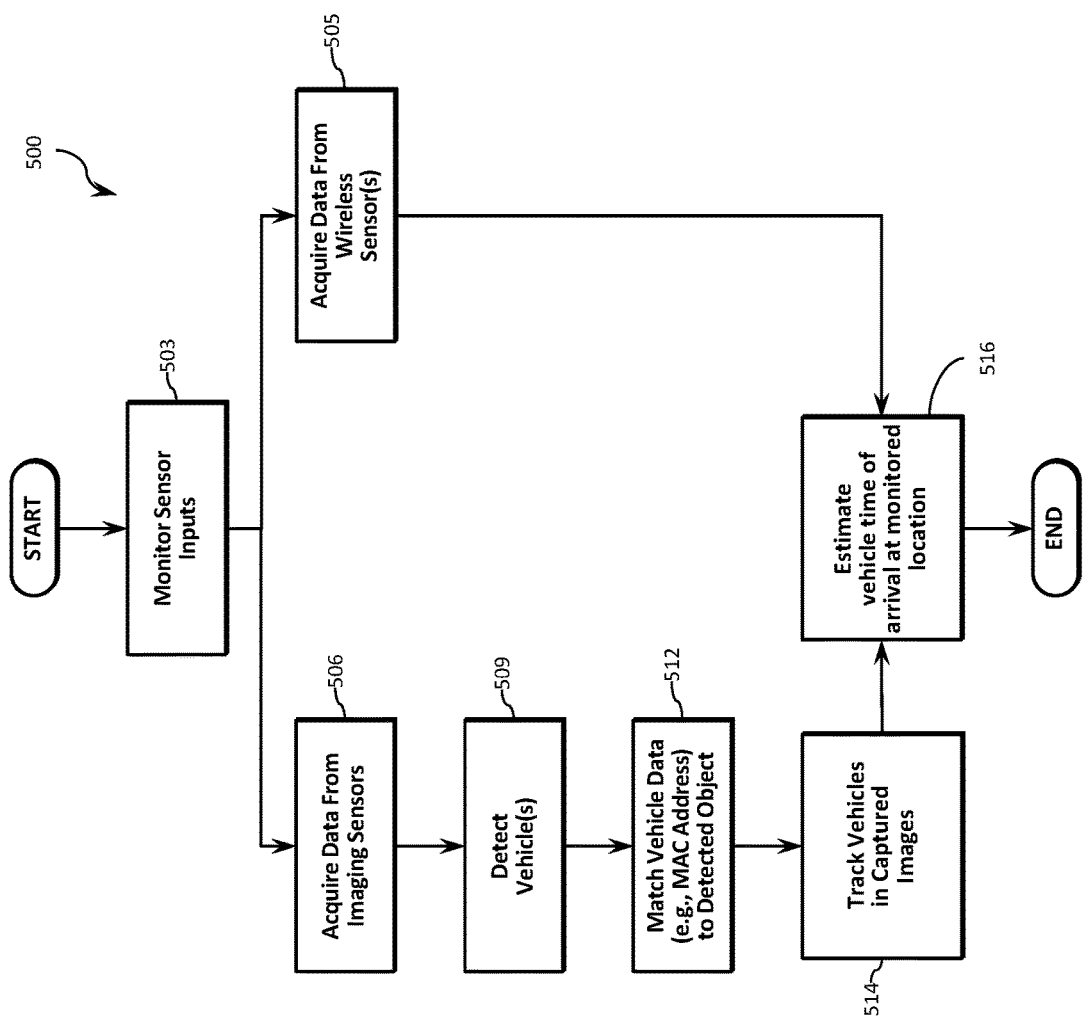
FIG. 5 is an example flow chart illustrating a vehicle tracking process, in accordance with one or more embodiments.

Turning now to the processes, methods, and other functionalities performed by the systems, devices, software, modules, algorithms, and other components of the present disclosure, FIG. 5 illustrates an exemplary vehicle tracking process in accordance with one or more embodiments. In one embodiment, a traffic monitoring system receives sensor input data (step 503) and processes the data to track traffic and one or more vehicles. In step 505, the system receives wireless communications from a vehicle, which may include a unique MAC address for the wireless device and/or GPS data from the wireless device, which may then be used in step 516 to track the vehicle and estimate a vehicle time of arrival at the monitored location. In parallel, image data, such as one or more thermal images, is acquired (step 506) from a field of view and analyzed to detect one or more vehicles (step 509). Next, in step 512 the vehicles detected in the images are mapped to geographic locations (e.g., by mapping object pixel locations to real world coordinates) and a matched to one or more vehicles (e.g., by comparing determined geographic locations to GPS data received via the wireless interface and/or cloud analytic platform). The vehicle is then tracked through image object detection and tracking (step 514) to determine its proximity to the monitored traffic location and to estimate a time of arrival of the priority vehicle at the monitored location (step 516). In some embodiments, the method 500 uses received GPS data when the priority vehicle is out of view of the image capture components, and transitions to pixel mapped geographical location when the priority vehicle is in visible range.

Figure 6:
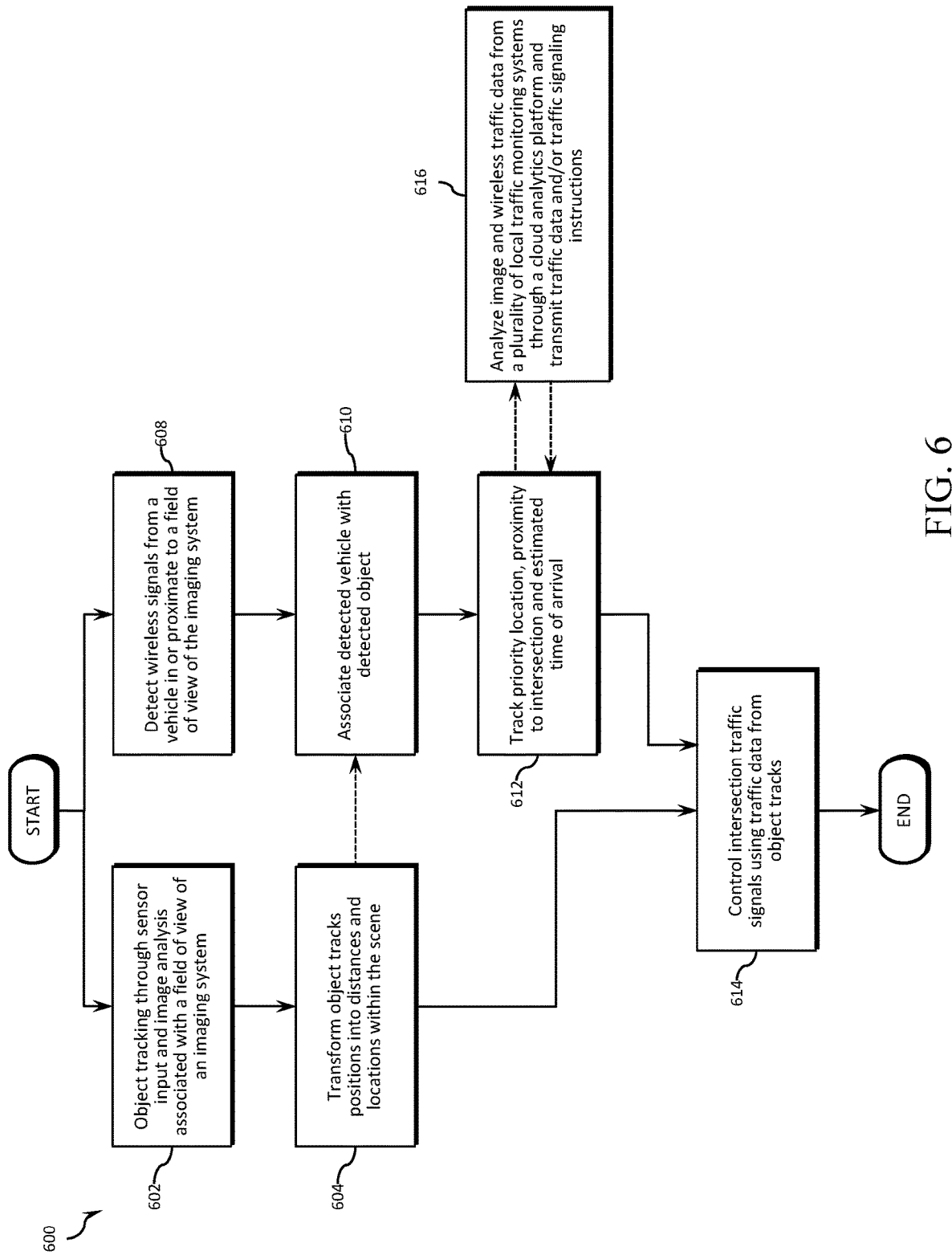
FIG. 6 is an example traffic control algorithm, in accordance with one or more embodiments.

Referring now to FIG. 6, an exemplary traffic control algorithm 600 using a cloud analytics platform in accordance with one or more embodiments will now be described. The algorithm tracks traffic through a monitored traffic zone such as an intersection in steps 602 and 604. In step 602, a stream of images is captured and analyzed to detect and track objects through the field of view. The objects may include vehicles, animals, pedestrians and other objects appearing in the field of view. Other sensor input may also be compiled, such as loop detector data and radar data. The object tracks may be transformed into real-world geographic locations within the scene in step 604. In some embodiments, the process includes a calibration process to map image pixels to real-world geographic locations. In some embodiments, steps 602 and 604 may be implemented using image capture components 130, including image sensors 132 and a detection subsystem 138, as illustrated in FIG. 1, image capture component 430 and processing component 422 as illustrated in FIG. 4, and/or through other systems and devices.

Contemporaneous with steps 602 and 604, the algorithm 600 also detects and processes wireless device data associated with wireless devices proximate to and/or within the traffic zone. In step 608, the algorithm detects wireless signals from one or more vehicles. The acquired wireless data may be tracked and mapped to a detected object track in step 610. In some embodiments, the wireless device data includes GPS coordinates. In some embodiments, the wireless data is transmitted to a cloud analytics platform for further processing in step 616 associated with the position and direction of travel of the detected vehicle. The cloud analytics platform analyzes data from a plurality of local traffic monitoring systems and returns traffic data for use in controlling the traffic location. In some embodiments the cloud analytics platform returns signaling instructions for the traffic signal. The vehicle is then tracked into and through the field of view, including determining proximity to the traffic zone and an estimated time of arrival in step 612.

In step 614, traffic data and vehicle information are correlated, along with data received from nearby intersection control systems (as available from the cloud analytics platform, for example) and analyzed to determine traffic control actions. The cloud analytics platform may provide information regarding physical locations of objects (e.g., vehicles, pedestrians) near an intersection and tracked paths and associated flow of traffic of objects coming into a field of view of the traffic control system. The location information from image capture sensors and other sensors from nearby traffic monitoring systems may be converted into geographic locations including proximity to the current traffic monitoring system, which may include locations associated with an entrance into the field of view and/or intersection, and an exit from the field of view and/or intersection. In one embodiment, the data is analyzed to determine a location and time at which one or more vehicles would be expected to approach, enter and exit the intersection in view of the tracked traffic data and at least one traffic signal command sequence to facilitate traffic flow through the intersection. In some embodiments, the control may further include transmitting instructions to an autonomous vehicle computer to modify its route in accordance with a traffic condition and/or instructions and information to an operator of the vehicle.

Figure 7:
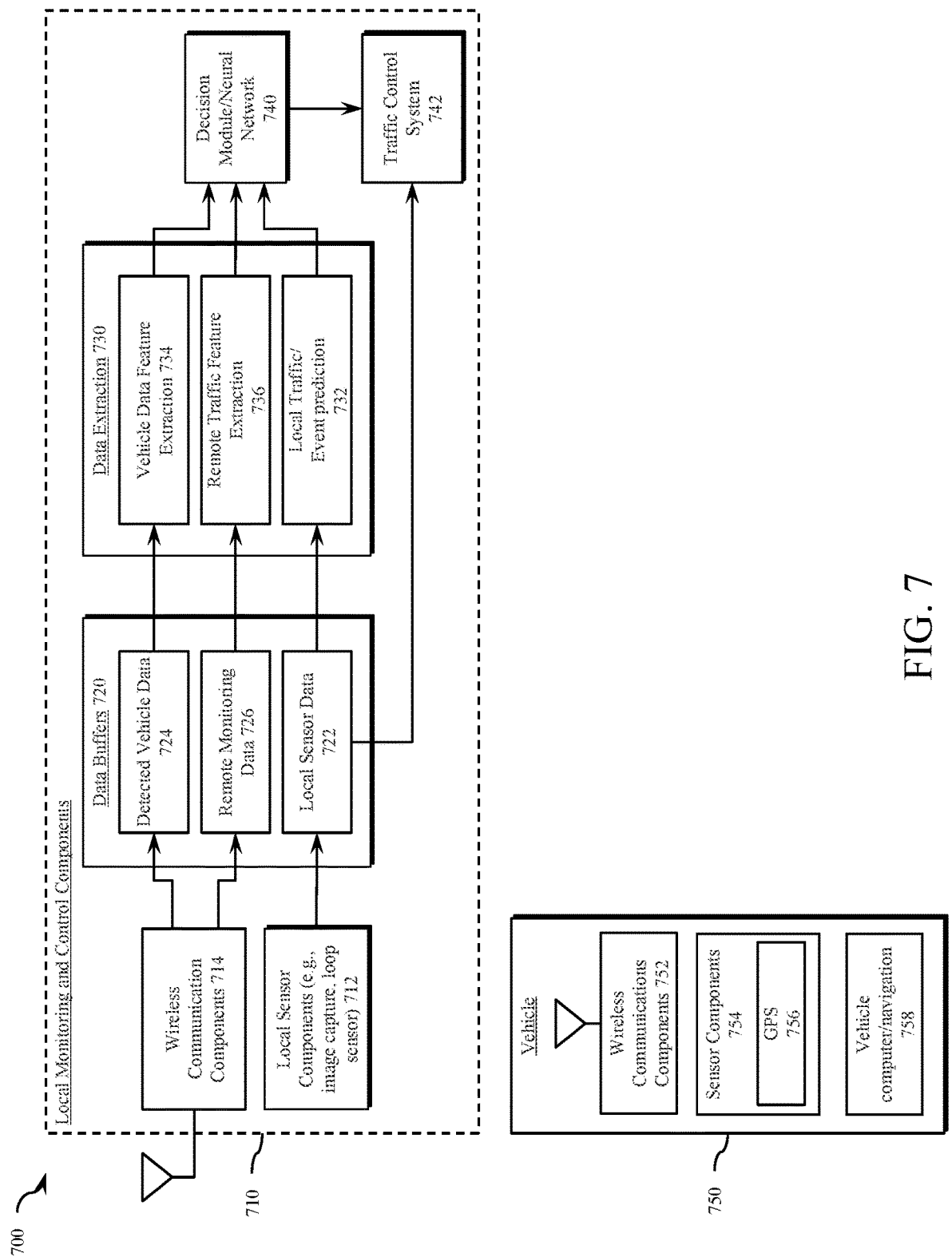
FIG. 7 is an example of monitoring and traffic control components, in accordance with one or more embodiments.

Referring to FIG. 7, various embodiments of systems and methods for controlling traffic systems will be described. As illustrated, the system 700 includes local monitoring and control components 710 configured to communicate with and/or detect at least one vehicle 750. The local monitoring and control components 710 include local sensor components (e.g., image capture, loop detector and other traffic monitoring sensors), wireless communication components 714 for communicating with at least one vehicle, data buffers 720 for storing received monitoring data (e.g., detected vehicle data 724, remote monitoring data 726 and/or local sensor data 722), data extraction modules 730, decision module 740 which may include a neural network, and a control and analytics system 742. In various embodiments, the monitoring components 710 may be implemented in one or more computing systems, sensor systems, communications systems and/or other devices in an infrastructure control system. In some embodiments, various processing modules including the data extraction module 730 and the decision module/neural network 740 may be implemented on the cloud analytics platform.

The vehicle 750 includes wireless communications components 752 operable to communicate with the wireless communications components 714 through a wireless communications protocol, such as Bluetooth, 802.11p, cellular, Wi-Fi or another wireless communications protocol. The vehicle 750 also includes sensor components 754, including GPS components 756, for generating real time position location of the vehicle 750, and a vehicle computer and/or navigation system 758 providing route information and other information to an operator of the vehicle and/or the local monitoring and control components 710.

The local sensor components 712 include one or more image sensors operable to capture images of a scene and image processing modules operable to identify and track objects in the captured images to generate a stream of object track data. The local sensor components 712 may further include other traffic feedback components, such as one or more loop detectors or radar systems. The wireless communications components 714 include a wireless sensor operable to receive communications from the vehicle 750, including data from at least one sensor component 754. The wireless communications components 714 may also receive data from other local monitoring systems (wirelessly or through a physical connection) and generate a stream remote monitoring data 726 (e.g., priority vehicles local to a remote system, traffic status of a remote system).

The data extraction modules 730 include feature extraction modules operable to determine feature characteristics associated with one or more priority vehicles (priority vehicle feature extraction module 734), remote traffic data received from other local monitoring systems or other information sources (remote traffic feature extraction module 736), and local traffic information (local traffic/event prediction module 732). The decision module 740 makes traffic control decisions based on the available data and may include a neural network trained to receive the extracted feature data and determine traffic control decisions to facilitate the passage of the vehicle(s) through the intersection (or other controlled roadway). The traffic control system 742 then modifies traffic control decisions and executes the traffic control actions in accordance with the decision module 740 output, which may include traffic signaling commands, instructions to the vehicle computer 758 and/or instructions to a vehicle operator.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein. Embodiments described above illustrate but do not limit the invention. It should also be understood that numerous modifications and variations are possible in accordance with the principles of the invention. Accordingly, the scope of the invention is defined only by the following claims.

What is claimed:

1. A system comprising:
a wireless signal sensor mounted at a first fixed location and configured to detect and receive wireless probe requests emitted from a plurality of wireless devices;
a first image sensor mounted at a second fixed location and configured to capture a stream of images of a field of view of a traffic zone; and
a traffic control system comprising a processor and a memory storing program instructions configured to cause the processor to:
estimate, using input from the wireless signal sensor, geographic positioning information for at least one vehicle identified from the wireless probe requests;
track the at least one vehicle's movement using the estimated geographic positioning information;
detect and track an object in the stream of images corresponding to the at least one vehicle, wherein the at least one vehicle's geographic movement is further tracked using a pixel location of the object in steam of images; and
execute a traffic control action based on the geographic movement of the at least one vehicle, wherein the traffic control action is determined to facilitate passage of the at least one vehicle through a monitored traffic control location.

2. The system of claim 1, wherein the traffic control system is further configured to determine a geographic location of the detected object using a mapping of image pixels to geographic coordinates.

3. The system of claim 1, wherein the wireless signal sensor is an 802.11p, Bluetooth, cellular, and/or Wi-Fi protocol sensor.

4. The system of claim 1, wherein the traffic control system is further configured to calculate an estimated time of arrival at the monitored traffic control location.

5. The system of claim 1, wherein the wireless probe requests include a media access control address (MAC address) for at least one of the plurality of wireless devices; and wherein the MAC address is transmitted to a cloud analytics platform for additional processing associated with one or more remote traffic control systems.

6. The system of claim 1, where the processor is further configured to detect and track objects in the stream of images.

7. The system of claim 1, wherein the wireless sensor is further configured to establish a wireless data communications link with at least one of the wireless devices; and wherein the wireless sensor is further configured to receive global positioning system data received from a global positioning system sensor associated with the wireless device.

8. The system of claim 1, wherein the processor is further configured to map global positioning data with one or more pixel locations corresponding to detected objects in the stream of images.

9. The system of claim 1, wherein the processing system is further configured to determine an estimated time of arrival for the at least one vehicle at the monitored traffic control location.

10. The system of claim 1, wherein the processing system is disposed at an intersection and the traffic control action includes changing a state of at least one traffic signal.

11. A method comprising:
    detecting and receiving, using a wireless sensor mounted at a first fixed location, wireless probe requests emitted from at least one wireless device;
    capturing, using a first image sensor at second fixed location, a stream of images of a field of view; and
    operating a traffic control system to control at least one traffic control signal in a monitored traffic control location, comprising:
        estimating and tracking geographic positioning information for the at least one wireless device based at least in part on the wireless probe requests;
        detecting and tracking an object in the stream of images corresponding to at least one vehicle, wherein the at least one vehicle's geographic movement is further tracked using a pixel location of the object in the steam of images; and
        executing a traffic control action based on the geographic movement of the at least one vehicle, wherein the traffic control action is determined to facilitate passage of the at least one vehicle through a monitored traffic control location.

12. The method of claim 11, further comprising determining a geographic location of the object using a mapping of image pixels to geographic coordinates.

13. The method of claim 11, wherein the wireless signals are 802.11p, Bluetooth, cellular, and/or Wi-Fi protocol signals.

14. The method of claim 11, further comprising calculating an estimated time of arrival at the monitored traffic control location.

15. The method of claim 11, wherein the wireless signals are associated with an emergency vehicle and the monitored traffic control location is a traffic intersection.

16. The method of claim 11, further comprising detecting and tracking objects in the stream of images.

17. The method of claim 11, further comprising establishing a wireless data communications link with at least one of the wireless devices; and receiving, via the wireless data communications link, global positioning system data received from a global positioning system sensor associated with the wireless device.

18. The method of claim 11, wherein the wireless probe requests comprise a media access control (MAC) address for the at least one wireless device; and wherein the method further comprises mapping the MAC address received via the wireless probe requests with a tracked vehicle.

19. The method of claim 18, further comprising determining a signal strength of the wireless probe requests; storing the signal strength and MAC address in a collection subsystem; and transmitting data stored in the collection subsystem to an analytics platform for traffic analysis.

20. The method of claim 11, wherein the traffic control system is disposed at an intersection and the traffic control action includes changing a state of at least one traffic signal.

* * * * *